(12) United States Patent
Zimmermann et al.

(10) Patent No.: US 10,798,808 B2
(45) Date of Patent: Oct. 6, 2020

(54) METHODS AND SYSTEMS FOR FORMING A LIQUID LINER OF A CAVITY

(71) Applicant: GENERAL FUSION INC., Burnaby (CA)

(72) Inventors: Joerg Zimmermann, Vancouver (CA); David Franklin Plant, Vanciyver (CA); Robert Vlastimil Bouchal, Surry (CA); Troy Nickolas Tyler, Coquitlam (CA); Victoria Suponitsky, Coquitlam (CA); Michael Harcourt Delage, Vancouver (CA); Michel Georges Laberge, West Vancouver (CA)

(73) Assignee: General Fusion Inc., British Columbia (CA)

( * ) Notice: Subject to any disclaimer, the term of this patent is extended or adjusted under 35 U.S.C. 154(b) by 0 days.

(21) Appl. No.: 16/634,127

(22) PCT Filed: Apr. 16, 2018

(86) PCT No.: PCT/CA2018/050457
§ 371 (c)(1),
(2) Date: Jan. 24, 2020

(87) PCT Pub. No.: WO2018/201227
PCT Pub. Date: Nov. 8, 2018

(65) Prior Publication Data
US 2020/0245445 A1    Jul. 30, 2020

Related U.S. Application Data

(60) Provisional application No. 62/532,819, filed on Jul. 14, 2017, provisional application No. 62/492,776, filed on May 1, 2017.

(51) Int. Cl.
H05H 1/02        (2006.01)
H05H 1/24        (2006.01)
H05H 1/54        (2006.01)

(52) U.S. Cl.
CPC .............. H05H 1/02 (2013.01); H05H 1/24 (2013.01); H05H 1/54 (2013.01)

(58) Field of Classification Search
CPC ... H05H 1/02; H05H 1/24; H05H 1/54; G21B 3/008; G21B 3/006; G21B 1/05; G21B 3/00; G21B 1/11; G21B 1/13
See application file for complete search history.

(56) References Cited

U.S. PATENT DOCUMENTS 4,140,057 A    2/1979  Turchi et al.
4,217,171 A *  8/1980  Schaffer .................. H05H 1/52
                                                          376/125

(Continued)

FOREIGN PATENT DOCUMENTS

CA        2 969 934 A1    7/2016

OTHER PUBLICATIONS

Laberge, Michel, "Acoustically driven magnetized target fusion", Journal of Fusion Energy, 27.1-2, (2008), pp. 65-68.
(Continued)

*Primary Examiner* — Borna Alaeddini
(74) *Attorney, Agent, or Firm* — Knobbe, Martens, Olson & Bear LLP

(57) ABSTRACT

Examples of systems for forming cavity and a liquid liner are described. The system comprises a vessel and a rotating member positioned within the vessel and rotatable about an axis of rotation. The rotating member has an inner surface 5 curved with respect to the axis of rotation, an outer and plurality of fluid passages that each has an inboard opening at the inner surface and an outboard opening at the outer (Continued)

surface. The rotating member is filled with a liquid medium and a rotational driver rotates the rotating member such that when rotating the liquid medium at least partially fills the fluid passages forming liquid liner, defining the 10 cavity. The cavity formation system is used in a liquid liner implosion system with an implosion driver that causes the liquid liner to implode inwardly collapsing the cavity. The imploding liquid liner system can be used in plasma compression systems.

22 Claims, 11 Drawing Sheets

(56) References Cited

U.S. PATENT DOCUMENTS

| | | | |
|---|---|---|---|
| 7,380,974 B2 * | 6/2008 | Tessien | B01J 19/008 366/114 |
| 7,425,092 B1 * | 9/2008 | Tessien | G21B 3/00 366/114 |
| 7,448,792 B2 * | 11/2008 | Tessien | B01J 19/008 366/114 |
| 9,271,383 B2 | 2/2016 | Howard et al. | |
| 2005/0129161 A1 | 6/2005 | Laberge | |
| 2012/0328066 A1 * | 12/2012 | Burke | G21B 1/01 376/111 |
| 2015/0034164 A1 * | 2/2015 | Suponitsky | G21B 3/008 137/1 |
| 2019/0139650 A1 * | 5/2019 | Laberge | G21B 1/21 |
| 2020/0027572 A1 * | 1/2020 | Krasnoff | G21B 3/008 |

OTHER PUBLICATIONS

Turchi, Peter J., "Imploding liner compression of plasma: Concepts and issues", IEEE Transactions on Plasma Science, 36.1, (2008), pp. 52-61.

International Search Report and Written Opinion, International Application No. PCT/CA2018/050457, dated Jul. 5, 2018, in 6 pages.

International Search Report and Written Opinion, International Application No. PCT/CA2018/050456, dated Jul. 9, 2018, in 6 pages.

* cited by examiner

METHODS AND SYSTEMS FOR FORMING A LIQUID LINER OF A CAVITY

Cross-Reference to Related Applications

This application is the U.S. National Phase under 35 U.S.C. § 371 of International Application No. PCT/CA2018/050457, filed Apr. 16, 2018, designating the United States and published in English on Nov. 8, 2018 as WO2018/201227, and which claims priority to U.S. Provisional Appl. No. 62/492,776, filed May 1, 2017 and U.S. Provisional Appl. No. 62/532,819, filed Jul. 14, 2017.

TECHNICAL FIELD

The present disclosure generally relates to methods and systems for forming a cavity in a liquid medium.

BACKGROUND

Systems for forming a cavity in a liquid liner and for imploding the liquid liner, as known in the prior art, form a cylindrical cavity that is collapsed by radially imploding a cylindrically shaped liquid liner. An example of such prior art imploding liquid liner system is LINUS system that was developed in the US Naval Research Laboratory in the 1970s. In the LINUS system a rotating cylindrical liquid metal liner is driven radially by free-pistons. The pistons are driven by a high pressure gas axially causing radial motion of the free-surface of the rotating liquid liner. The initial rotation of the liquid metal is provided by rotating the cylindrical vessel in which the liquid medium is contained. The entire vessel is rotated about its longitudinal axis, so that a cylindrical cavity is formed along and coaxial with the axis of rotation.

SUMMARY

In one aspect, a system for forming a liquid liner of a cavity is provided. The system comprises a vessel having an outer wall and a rotating member positioned inside the vessel and rotatable about an axis of rotation. The rotating member comprises a first end and a second end along the axis of rotation, an inner surface that defines an interior volume and which is curved with respect to the axis of rotation, an outer surface that has a shape that is a function of a shape of the inner surface and a plurality of fluid passages with an inboard opening at the inner surface and an outboard opening at the outer surface. A rotating driver is operationally coupled to the rotating member to rotate the rotating member. A liquid medium is provided in the vessel such that the liquid medium at least partially fills the fluid passages and forms a liquid liner with an inner interface of the liquid liner that curves with respect to the axis of rotation defining a cavity.

In another aspect, the rotating member is asymmetric such that the Δr at the first end of the rotating member is smaller than the Δr at the second end.

In one aspect, the shape of the outer surface of the rotating member is determined according to an equation $$P_{out(top)} + \rho g(z_0 - z) = P_{in} + \rho \omega^2 \int_{r_i(z)}^{r_o(z)} r\,dr$$

where $P_{out(top)}$ is a pressure at the outer surface at the first end of the rotating member; $P_{in}$ is a pressure at the inner surface of the rotating member; $z_o$ is a reference point at the inner surface; z is a variable distance along the axis of rotation; ρ is a density of the liquid medium; g is an acceleration due to gravity along the axis of rotation; ω is rotational speed in rad/s; r is a variable perpendicular distance from the axis of rotation; $r_o(z)$ is a function defining the radius of the outboard openings of the passages from the axis of rotation and $r_i(z)$ is a function defining the radius of the inboard openings of the passages from the axis of rotation.

In one aspect, when the first end is above the second end, the rotating member is asymmetric such that a difference between a radius of the outboard opening from the axis of rotation and a radius of the inboard opening from the axis of rotation (Δr) at the first end of the rotating member is smaller than the Δr at the second end.

In one aspect, the vessel comprises a stator that encloses the rotating member. The stator comprises a first end axially aligned with the first end of the rotating member, a second end axially aligned with the second end of the rotating member, an inside wall facing and spaced apart from the outer surface of the rotating member and cells extending between the inside wall and the outer wall to break down a strong eddy that can develop inside the stator and reduce exchange of momentum between flow inside the stator and fluid passages of the rotating member. The cells are open at the inside wall of the stator and at the outer wall.

A number of axially spaced ledges and radially spaced dividers are arranged to define the cells of the stator. At least some of the ledges comprise at least one hole which allows the flow of the liquid medium, so that when the rotating member is rotating the liquid medium can flow toward the first end and the second end of the rotating member.

In another aspect, a shape of a cross-section of the cells' opening at the inside wall of the stator is different from a shape of a cross-section of the outboard opening of the rotating member. The shape of the cross-section of the outboard opening is selected such that during rotation of the rotating member the plurality of fluid passages in the rotating member do not completely align with the inside opening of the cells of the stator.

In one aspect, a liquid liner implosion system for collapsing a cavity by imploding a liquid liner is provided. The liquid liner implosion system comprises the system for forming the liquid liner and an implosion driver that is in fluid communication with the rotating member and is operable to provide a fluid flow through the outboard openings of the rotating member to displace the liquid medium in the fluid passages through the inboard openings of the rotating member and implode the liquid liner towards a central region of the cavity.

In one aspect, the implosion driver comprises a plurality of piston assemblies connected to the outer wall of the vessel and arranged symmetrically around the periphery of the outer wall. Each of the piston assemblies comprises a housing to define an inner bore with an open end and a close end, a piston slidably positioned in the inner bore between the open end and the close end and a driver operable to drive the piston towards the open end. The liquid medium in the vessel partially fills the inner bore of the piston assemblies, such that when the piston is driven towards the open end of the inner bore the liquid medium in the inner bore is injected through the outboard openings of the rotating member, thereby displacing the liquid medium in the fluid passages through the inboard openings of the rotating member.

In another aspect, the fluid is a pressurized fluid and the implosion driver comprises a plurality of valves that are connected to the outer wall of the vessel and are fluidly communicable with at least some of the outboard openings of the rotating member. The plurality of valves are in fluid communication with a source of the pressurized fluid so that when the valves open they inject the pressurized fluid through the outboard openings into the plurality of fluid passages of the rotating member.

In one aspect, a plasma compression system is provided. The plasma compression system comprises the liquid liner implosion system and a plasma generator configured to generate plasma. The plasma generator is connected to the vessel such that an outlet of the plasma generator is inserted in an opening formed in the outer wall of the vessel. The vessel's opening is aligned with an entrance opening formed at one of the first or the second ends of the rotating member such that the generated plasma can be injected into the cavity. When the liquid liner implosion system implodes the liquid liner inwardly towards the central region it collapses the cavity and compresses the plasma trapped therein.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

Figure 1:
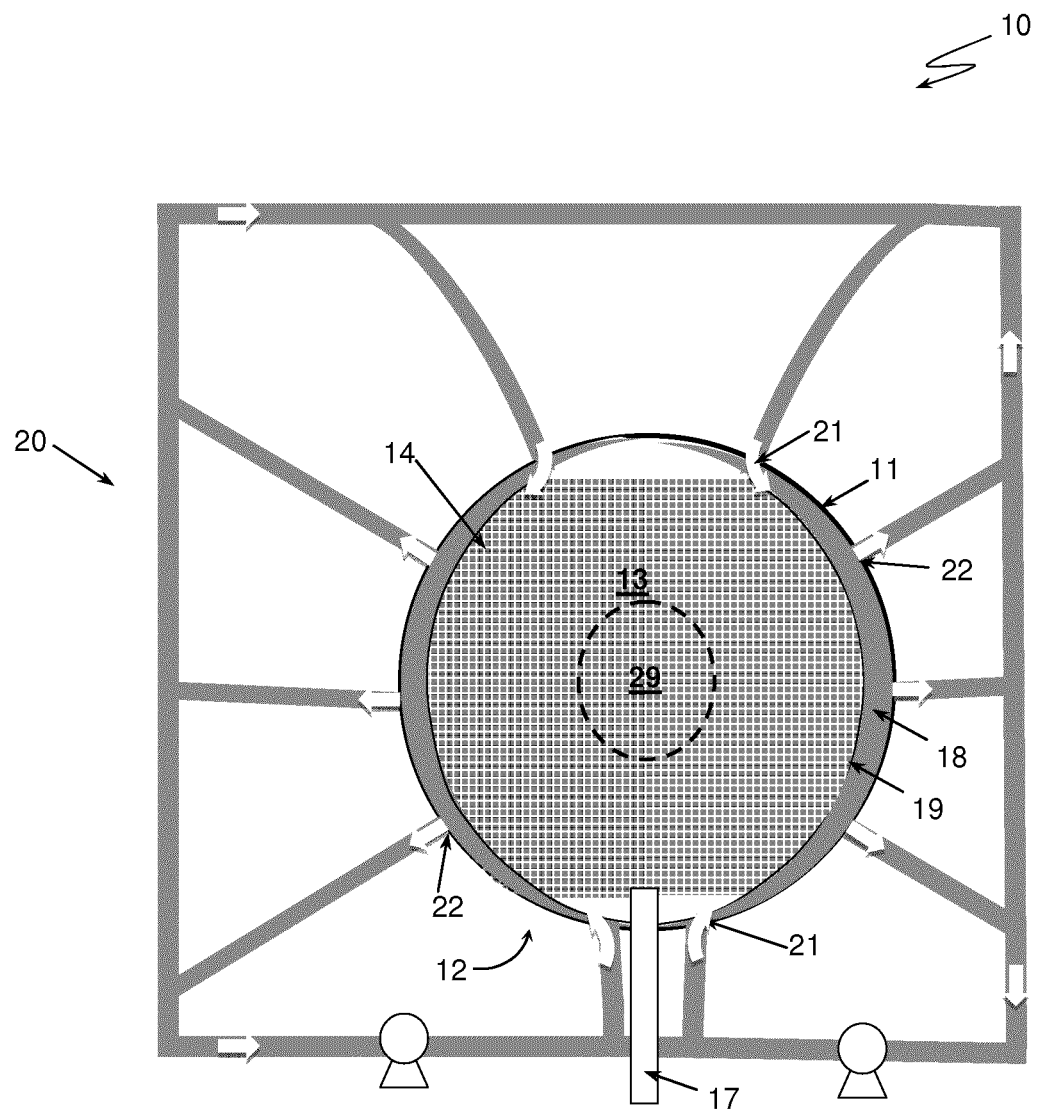
FIG. 1 is a schematic cross-sectional side view of an example of a system for forming a liquid liner of a cavity with a rotating inner interface curved inwardly towards an axis of rotation.

FIG. 1 illustrates an example of a system 10 for forming a cavity 13 into a liquid medium such that a liquid liner 18 surrounds the cavity 13. The system 10 comprises a vessel 12 that has an outer wall 11 and a rotating member 14 that is placed inside the vessel 12 and is rotatable about an axis of rotation. The rotating member 14 can comprise a plurality of channels (passages) 16 (see FIG. 2) and an interior volume is defined inside the rotating member 14. The rotating member 14 can be partially filled with the liquid medium such that the liquid medium can at least partially fill the channels 16 when the rotating member 14 rotates. The liquid medium can be a liquid metal, such as for example, liquid lithium or liquid lead/lithium alloy, or any other fluid, alloy or a combination thereof suitable to form a liquid liner when the rotating member 14 is rotated. A rotational driver is coupled to the rotating member 14 to rotate the rotating member 14, such that the liquid medium is driven circumferentially and is constrained latitudinally filling the channels 16 and forming the liquid liner 18 with a rotating inner interface 19 curved inwardly towards the axis of rotation. The liner 18 defines the cavity 13. The rotational driver can, for example, comprise a rod 17 connected to at least one part of the rotating member 14, and a power source (not shown) in communication with the rod 17 is provided to rotate the rotating member 14. In another implementation, the rod 17 can be omitted and the rotating member 14 can rotate using the flow of the liquid medium.

A liquid circulating system 20 can be provided to direct the flow of the liquid medium in the system 10. The circulating system 20 can comprise a plurality of valves, nozzles, pipe-network and one or more pumps to achieve the desired flow of liquid medium in the rotating member 14. The circulation system 20 further comprises one or more injection ports 21 to inject the liquid medium into the rotating member 14 and one or more draining ports 22 to drain the liquid medium out of the rotating member 14 and the vessel 12. For example, the injection ports 21 can be formed in proximity to the poles of the vessel 12 while the draining ports 22 can be formed at the equator of the vessel 12 or at various latitudes near the equator. In one embodiment, a flow control may be provided at the injection/drain ports 21, 22 to control fluid flow through the ports. In one implementation, the liquid flow circulating system 20 can be completely or partially positioned within the vessel 12 such that the liquid flow is directed using for example, a magnetic system, shaping the ports 21/22, without using an extended pipe network surrounding the vessel 12. In one implementation, the circulation system can be used to fill and empty the rotating member. For example, a pre-determined quantity of liquid medium can be injected through the one or more of the ports 21/22. The ports can then be closed and the rotating member 14 rotated to form the liner 18. When the vessel needs to be emptied, it can be done through the same or different ports.

The rotating member 14 can be placed within the vessel 12 or it can be positioned within a stator 100 (see FIG. 5) that is stationary and encloses the rotating member 14. For the purpose of this application, the stator means a non-rotating component within which the rotating member 14 rotates and forms the cavity 13 and the liquid liner 18. The stator 100 can be separate from the vessel 12, such that an assembly of the stator 100 enclosing the rotating member 14 can be positioned within the vessel 12 or the stator 100 can be connected to the vessel 12 forming a single structural element with the vessel 12, and the rotating member 14 can be positioned within the vessel 12, such that the vessel 12 is the stator.

Figure 2:
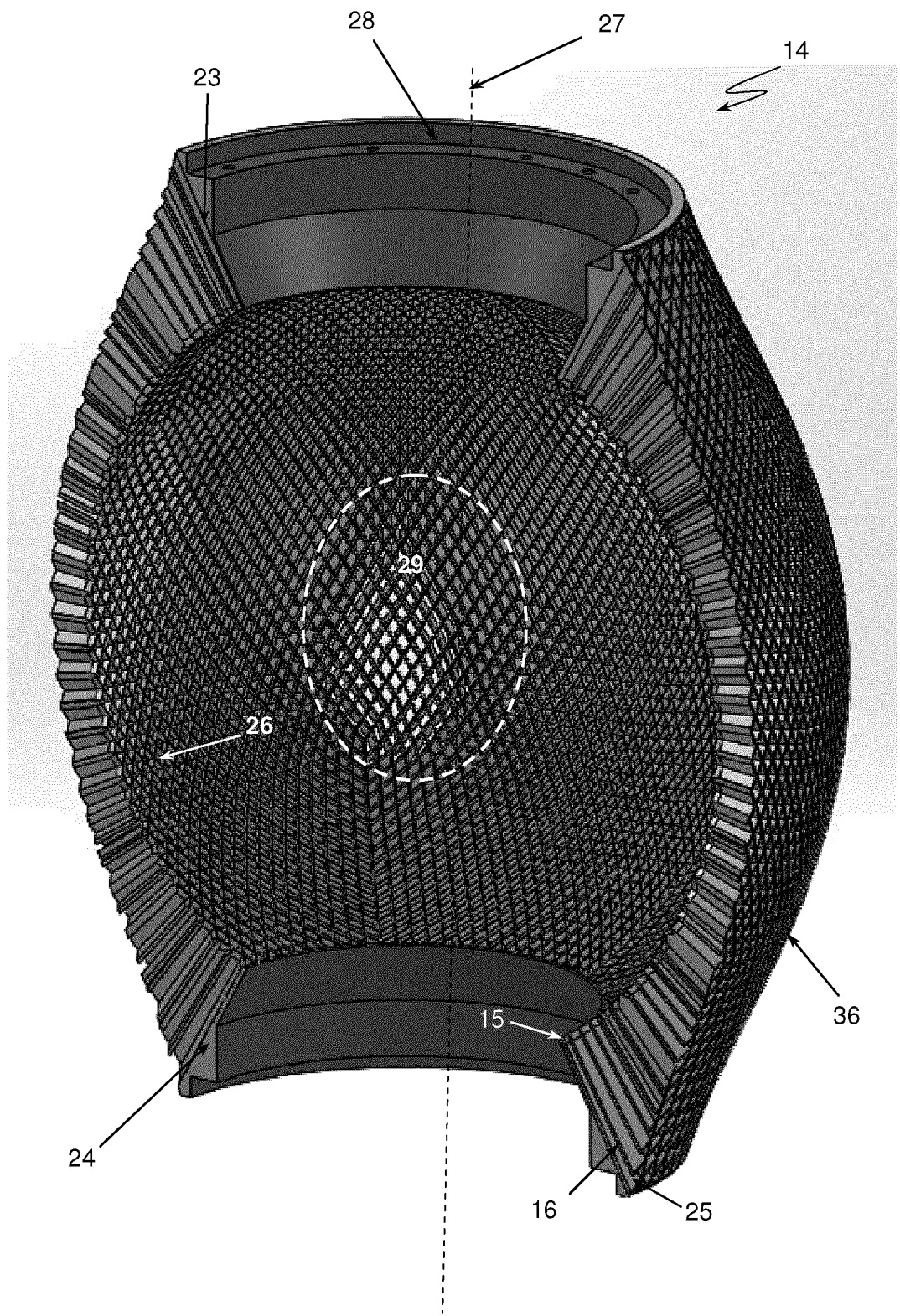
FIG. 2 is a perspective cross-sectional view of an example of a rotating member with a plurality of fluid passages.

FIG. 2 illustrates a cross-section of the rotating member 14 showing the plurality of channels/passages 16. Each of the passages 16 has an inboard opening 15 at an inner surface 26 of the rotating member 14 and an outboard opening 25 at a back (outer) surface 36 of the rotating member 14. The inner surface 26 is coaxial with the axis of rotation 27. The rotating member 14 can have a first end 23 (a top pole) and a second end 24 (a bottom pole). The inner surface 26 of the rotating member 14 curves with respect to the axis of rotation 27 such that a part (or parts) of the inner surface 26 can curve inwardly towards the axis of rotation 27 while other part(s) can curve outwardly with respect to the axis of rotation 27 (further away from the axis of rotation). Figures show a rotating member 14 where the inner surface 26 curves inwardly at each of the first and the second ends 23 and 24 (spherically shaped inner surface 26), however persons skilled in the art would understand that the inner surface 26 can have another curving shape such as a convex shape (curving outwardly at each of the first and the second ends 23 and 24) or a waving shape without departing from the scope of invention. The rotating member 14 can further comprise an entrance opening 28 formed at the first end 23 or the second end 24 of the rotating member 14. An entrance opening 28 can be formed on one or both ends 23, 24 of the rotating member 14 without departing from the scope of the invention. The passages 16 are opened at the inboard opening 15 and at the outboard opening 25 so that the liquid medium can flow through the rotating member 14. The shape of the openings 15, 25 and the cross-section of the passages/channels 16 can be a rectangular, circular, diamond shape or another suitable shape without departing from the scope of the invention. Each of the passages 16 can have a wall extending between the outboard opening 25 and the inboard opening 15 defining the cross-section of the passages, e.g. a rectangular, circular, diamond shape or any other suitable cross-section. FIG. 2 for example illustrates the rotating member 14 with a diamond shaped cross-section of the channels 16, however this is for illustration purposes only, and the cross-section of the channels 16 can have another suitable shape without departing from the scope of the invention. The cross section of at least some of the passages 16 can taper inwardly from the outboard opening 25 towards the inboard opening 15, converging toward a central region 29 of the cavity 13. The inboard opening 15 of the passages 16 is directed and converges towards the central region 29 of the cavity 13. Some of the passages 16 can be inclined and/or curved such that the inboard opening is directed (converges) toward the central region 13 of the cavity 13. In one implementation, the wall of some of the passages 16 at the inboard openings 15 can be tapered/ chamfered. The aspect ratio of the passages 16 is such that any flow pattern that may develop on the interface between the outer surface 36 of the rotating member 14 and the stationary wall (e.g. wall 11 of the vessel 12 or the wall of the stator) or inside the passages 16, does not propagate to the inner interface 19 of the liquid liner 18. For example, the ratio of the depth (length) to the cross-section (width) of each of the passages 16 can be 3:1 or higher. The length, width and/or the height of the passages 16 can vary, such as for example, the passages 16 in proximity to the ends 23, 24 may be narrower and/or longer than the passages 16 away from the ends 23, 24.

Figure 3:
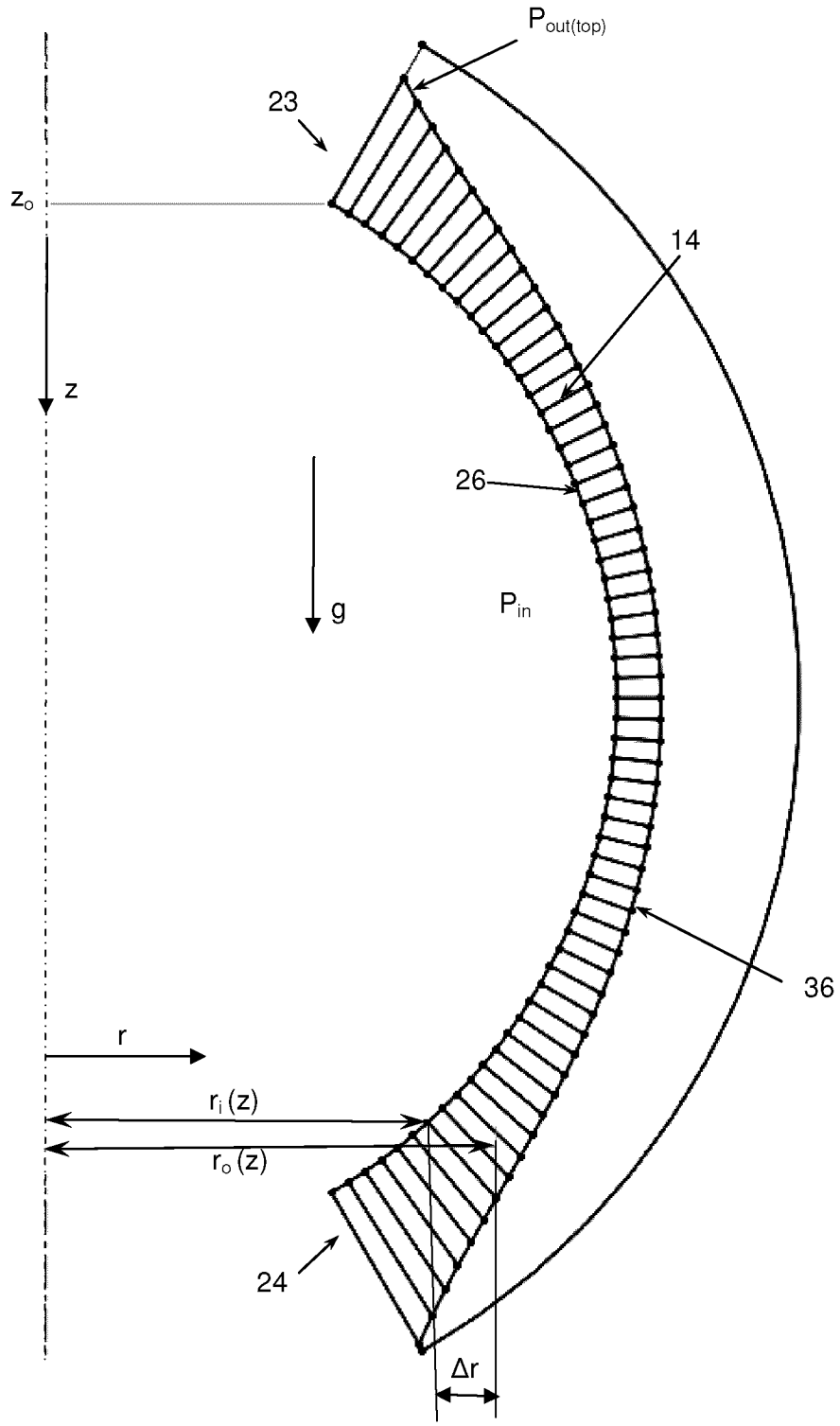
FIG. 3 is a partial side cross-sectional view of an example of a rotating member for forming a liquid liner of a cavity showing a shape of an inner surface and a shape of an outer surface of the rotating member.

The liquid being spun by the rotating member 14 is forced against the wall 11 of the vessel 12 (or the wall of the stator) forming the cavity 13 and the liquid liner 18. The shape of the rotating member 14, such as its inner surface 26 and/or its outer surface 36 can be curved, such that the rotating member 14 can be spherical or oblate (egg-shaped) or any other suitable shape or combination thereof without departing from the scope of the invention. The shape of the liquid liner interface 19 can be controlled and adjusted by controlling the pressure at the outer surface 36 of the rotating member 14. In operation, the pressure along the outer surface 36 is kept close to uniform in order to form a liquid liner 18 with a desired inner interface 19. The shape of the outer surface 36 is a function of the shape of the inner surface 26 such that for a pre-set inner surface 26 the shape of the outer surface is determined so that the pressure along the outer surface is close to uniform. FIG. 3 shows a partial cross-sectional view of the rotating member 14 with the outer surface 36 that has a shape that can be determined according to the equation:

$$P_{out(top)} + \rho g(z_o - z) = P_{in} + \rho \omega^2 \int_{r_i(z)}^{r_o(z)} r\,dr \qquad (1)$$

where $P_{out(top)}$ is a pressure at the outer surface 36 at the first (top) end 23 and is a design input; $P_{in}$ is a pressure at the inner surface 26 of the rotating member 14 and is defined by the substance contained in the cavity 13, i.e. gas, plasma, magnetic field, etc.; $z_o$ is a reference point at the inner surface 26 as shown in FIG. 3; z is a variable distance along the axis of rotation; ρ is a density of the liquid medium; g is an acceleration due to gravity along the axis of rotation of the rotating member 14; ω is rotational speed in rad/s; r is a variable perpendicular distance from the axis of rotation; $r_o(z)$ is a function defining the radius of the outboard end 25 of the passage 16 from the axis of rotation and $r_i(z)$ is a function defining the radius of the inboard end 15 of the passage 16 from the axis of rotation. Persons skilled in the art would understand that for systems that are not vertically oriented (e.g. systems that are tilted or horizontally oriented) the equation (1) should be adapted to account for the offset of the gravitational vector from the axis of rotation.

According to equation (1), the outer surface 36 of the rotating member 14 of FIG. 3 is shaped such that a change of radius Δr (Δr=$r_o$-$r_i$) of the channels/passages 16 at the ends 23, 24 is bigger than the change of radius Δr of the channels 16 away from the ends 23, 24. Thus, Δr gradually decreases from the ends 23, 24 toward the equator of the rotating member 14. One should be aware that there can be a small pressure gradient at the outer surface 36 of the rotating member 14 due to the gravity. However, in rotational systems, such pressure gradient is relatively small since the gravitational acceleration is much smaller than the angular acceleration. That being said, in smaller sized systems in which the pressure is lower, the slight pressure gradient from gravity may influence the curvature of the liquid liner inner interface. In order to compensate for the pressure gradient due to gravity, the rotating member 14 where the first end 23 is above the second end 24 can be asymmetric about an equatorial plane, such that for example, the Δr at the first (top) end 23 can be smaller than the Δr at the second (bottom) end 24 for spherically shaped inner surface 26.

The rotating member 14 can be a single member or it can be made of two of more parts interlocked together forming the rotating member 14. For example, the rotating member 14 can have a number of latitudinal parts that are spaced along the rotation axis and can be stacked and nested one to another forming the rotating member 14. Each of the parts can rotate independently to adjust the parameters of the liquid liner 18. The plurality of interlocking parts can rotate at different speeds to adjust the geometry of the liquid liner 18 or the geometry of the collapse of the liquid liner 18.

Figure 4A:
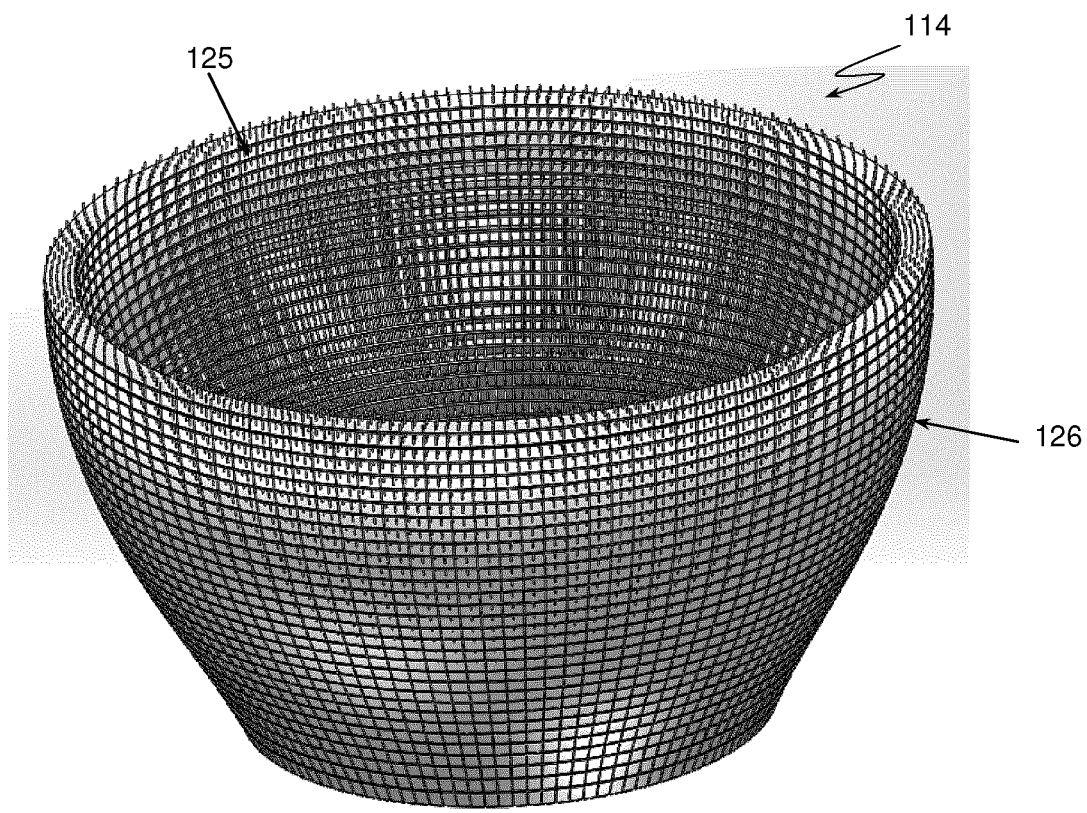
FIG. 4A is a perspective cross-sectional view of an example of a rotating member with a plurality of axial rings and a plurality of radial posts extending between the rings to form a number of fluid passages.
Figure 4B:
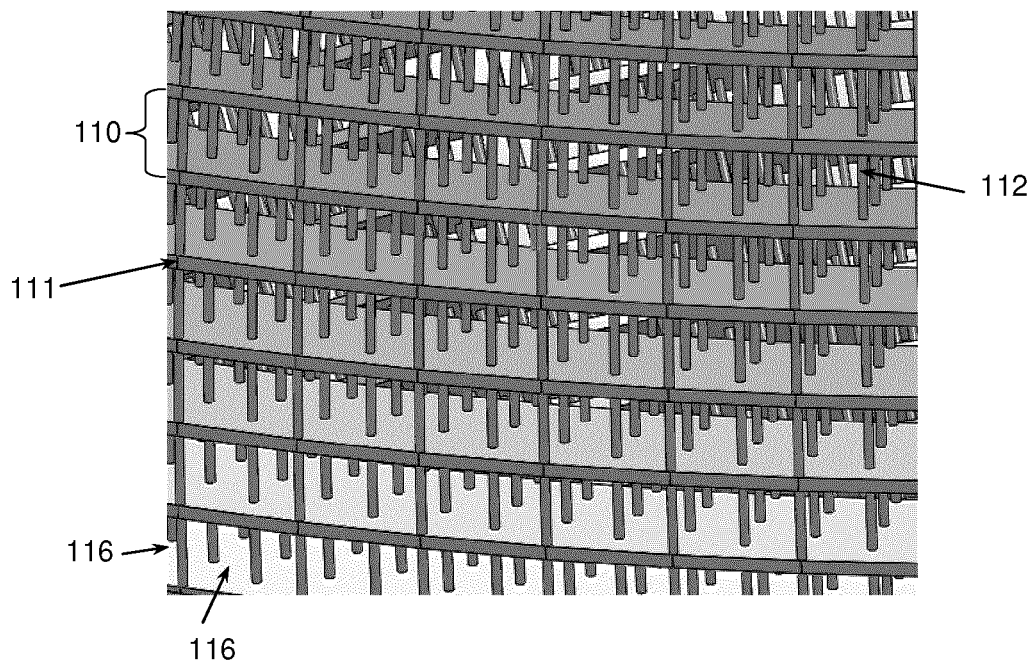
FIG. 4B is a cross-sectional detail view of a port of the rotating member of FIG. 4A.

FIGS. 4A and 4B depict another embodiment of a rotating member 114 that can be used in systems for forming a cavity and a liquid liner with a curved inner interface. The rotating member 114 has an inner surface 125 and an outer surface 126 that are coaxial with the axis of rotation. The inner surface 125 of the rotating member 114 curves inwardly towards the axis of rotation. A number of inboard openings are formed at the inner surface 125 and a number of outboard openings are formed at the outer surface 126. The rotating member 114 comprises a plurality of axially spaced rings 111 and a plurality of radially spaced posts 112 extending between the plurality of rings 111, such that the plurality of posts 112 and the plurality of rings 111 define the plurality of possible fluid passages 116. The rings 111 can be horizontally aligned conical sections whose foci are at the central region of the cavity, meaning that latitudinal channels formed by the rings 111 converge toward the central region. The plurality of rings 111 divide the rotating member into latitudinal zones 110 and the posts 112 form a number of possible fluid flowing passages 116 in each latitudinal zone 110. During rotation of the rotating member 114, the fluid in each latitudinal zone 110 can flow in radial and toroidal directions through the passages 116 formed by the arrangement of the posts 112. For example, the posts 112 can be arranged with a geometry that forms a straight configuration of passages similar to channels 16 of FIG. 2. In one embodiment, the posts 112 in one latitudinal zone 110 can be aligned in a vertical direction with the posts 112 in another latitudinal zone. The fluid flow between an inner surface 125 and an outer surface 126 of the rotating member 114 can be constrained latitudinally, but within one latitudinal zone 110 the fluid flow can have varying path (the shape and path of the passages 116 varies) in radial and toroidal direction.

Figure 5:
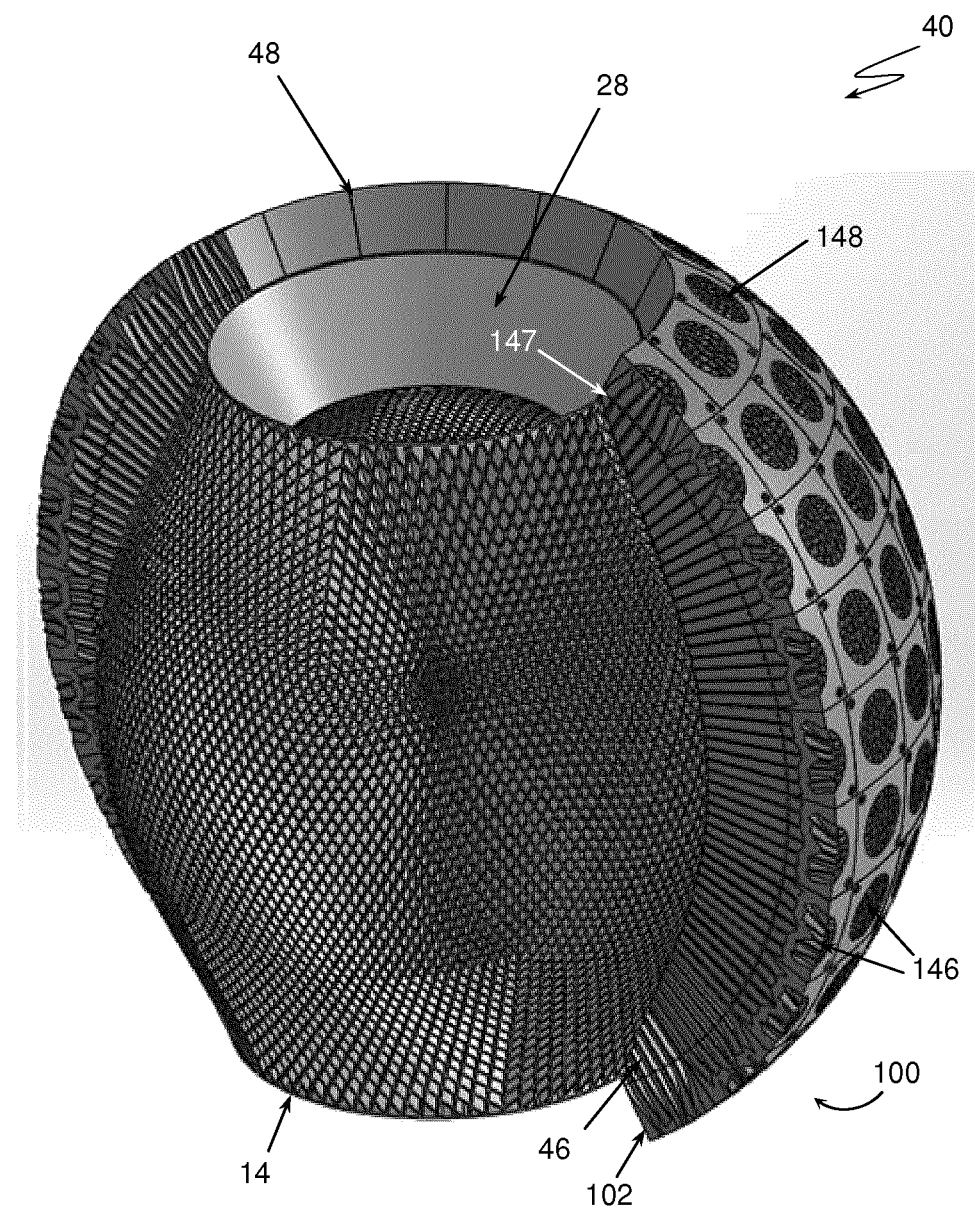
FIG. 5 is a perspective cross-sectional view of a liquid liner formation system showing the rotating member of FIG. 2 positioned within a stator.
Figure 6:
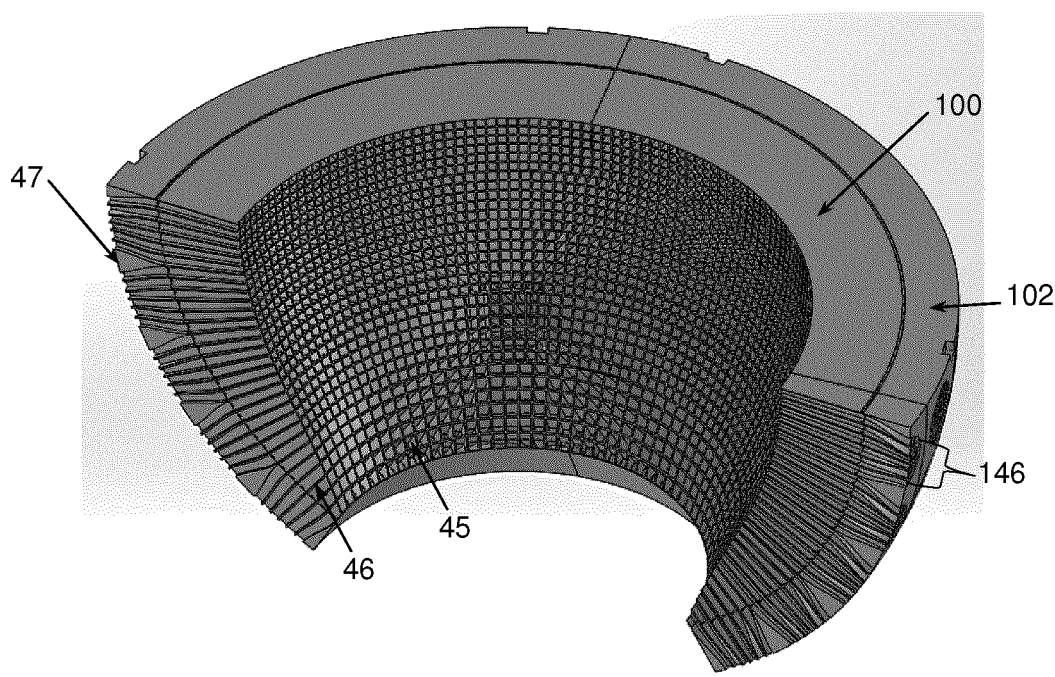
FIG. 6 is a perspective partial cross-sectional view of an example of a stator.

FIG. 5 shows one example of an assembly 40 of a rotating member 14 (of FIG. 2) and a stator 100 enclosing the rotating member 14. The assembly 40 can be positioned within the vessel 12. As previously indicated, the stator 100 can be connected to the vessel 12 without departing from the scope of the invention. An opening 48 is formed in the stator 100 that is aligned with the entrance opening 28 of the rotating member 14. The stator 100 comprises a first end axially aligned with the first end 23 of the rotating member, a second end axially aligned with the second end 24 of the rotating member, an inside wall 45 facing and spaced apart from the outer surface 36 of the rotating member and a number of cells 46 that are open at the inside wall 45 and at an outside wall 47 of the stator 100. The cells 46 are configured to break down a strong eddy that can develop inside the stator's cavity and reduce exchange of momentum between flow inside the stator 100 and passages 16 of the rotating member 14. The cells 46 are more clearly shown in FIGS. 6 and 7. The outside wall 47 of the stator 100 can be in some implementations the same as the outer wall 11 of the vessel 12 and cells 46 can be open at the outer wall 11 of the vessel 12. At least some of the cells 46 can have a cross section that tapers/converges inwardly from the outer wall 47/11 towards the inside wall 45. In one implementation, the cells 46 can be closed (or partially closed) at the outside wall 47 (see FIG. 7). The cells 46 can be formed by a number of axially spaced ledges 50 and a number of radially spaced dividers 52 extending between the outside and the inside walls 47, 45 of the stator 100. The inside wall 45 of the stator 100 is shaped such that it matches the shape of the outer surface 36 of the rotating member 14 while the outside wall 47 can be shaped to match the shape of the vessel 12. The aspect ratio of a depth (length) to a cross-section (width) of each of the cells 46 can be at least 3:1 in order to mitigate and prevent any fluid motion that can develop in the cells 46 or between the stator 100 and the rotating member 14 and which may affect the inner interface 19 of the liquid liner 18. In one implementation the cells 46 can be combined into a number of cell clusters 146 to adapt the outer end of the cells 46 to fit (align) with any ports (see ports 94 in FIG. 10) that may be formed in the outer wall 11 of the vessel 12. For example, the stator 100 can comprise an outer shell 102 that include the cell clusters 146 and which can be a single piece or a multiple interconnected pieces (multiple cell clusters 146 interconnected together). The outer face of the shell 102 can be in contact to the wall 11 of the vessel 12. The cell clusters 146 can have a rectangular inner face 147 with flow cells aligned with the cells 46, and a circular outer face 148 (see FIG. 5). The inner and outer faces 147, 148 of the cell clusters 146 could be any shape without departing from the scope of the invention. At least some of the cells in each cell cluster 146 can have a tapered configuration towards the circular face 148 to accommodate the transition from the rectangular inner face 147 to the circular outer face 148.

Figure 7:
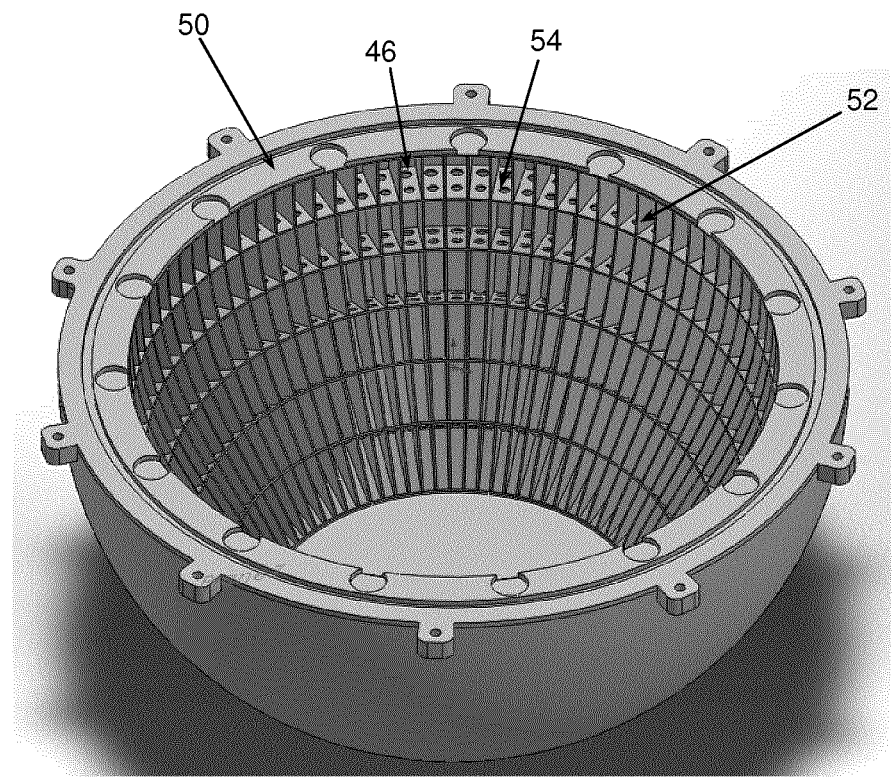
FIG. 7 is a perspective cross-sectional view of an example of a stator showing a number of ledges and dividers forming cells/baffles of a stator.

FIG. 7 further shows that the ledges 50 can have one or more holes 54, so that the liquid medium can flow through such holes 54 from one latitudinal zone to the other in a vertically oriented system. The cells 46 and the holes 54 provide that the liquid medium can flow only in one direction (e.g. in vertical direction between equator and the poles in a vertically oriented system or in horizontal direction in a horizontally oriented system) when the rotating member 14 rotates. This keeps the fluid in the stator 100 from spinning and developing a pressure gradient at the outer surface 36 of the rotating member 14. The pressure of the spinning liquid medium at the equator can push the liquid medium down the cells 46 toward the poles (ends 23, 24) and acts as a self-pumping centrifugal pump, thus avoiding the need of an external liquid circulating system 20. In vertically oriented systems, the liquid medium will flow from the equator toward the upper pole (first end 23) and from the equator toward the lower pole (second end 24) using the centripetal force due to the rotation of the rotating member 14.

Figure 8:
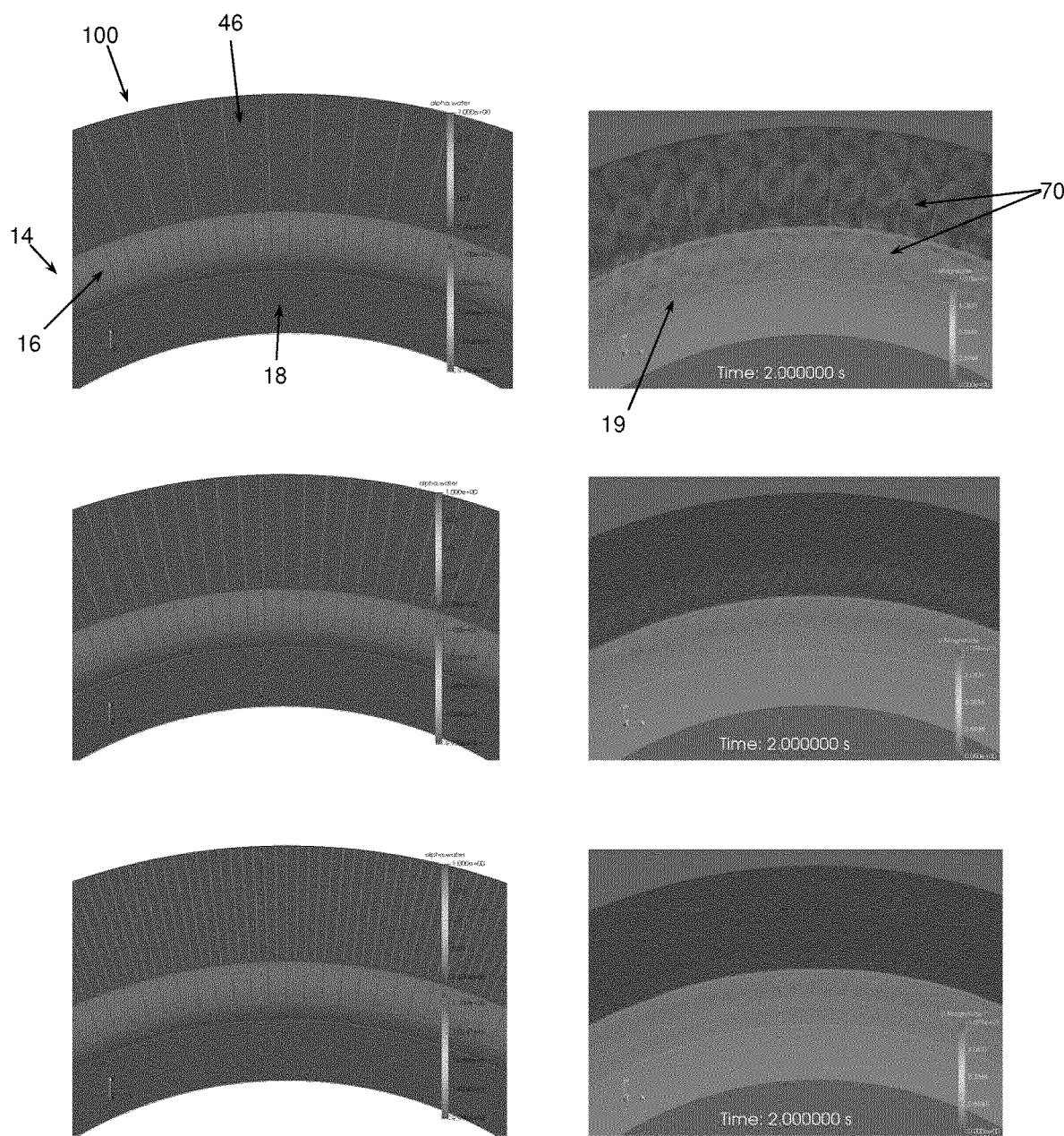
FIG. 8 is a top partial cross-sectional view of an example of a numerical model of an assembly of a stator and a rotating member.

FIG. 8 is an example of an equatorial cross-section of a numerical model of an assembly of the stator 100 and the rotating member 14. Many different geometries of a stator/rotating member assembly were modeled in order to study the flow field in a stator/rotating member assembly and its effect on the inner interface of the liquid liner at number of rotational speeds and a viscosity of water. The geometries modelled look at several ratios of the cross-section of the stator's cells to the cross-section of the rotating member's cells and some results are shown in FIG. 8. The first simulated geometry, illustrated at the top two views of FIG. 8, represents an assembly of a stator 100 and a rotating member 14 where the cross-section (e.g. the width) of the cells 46 of the stator 100, at the interface between the rotating member 14 and the stator 100, are double of the cross-section (width) of the passages 16 of the rotating member 14. The second simulated geometry (views at the middle), represents an assembly of a stator 100 and a rotating member 14 where the cross-section (width) of the cells 46 of the stator 100, at the interface between the rotating member 14 and the stator 100, is the same as the cross-section (width) of the passages 16 of the rotating member 14. The third simulated geometry, illustrated at the bottom two views in FIG. 8, represents an assembly of a stator 100 and a rotating member 14 where the cross-section (width) of the cells 46 of the stator 100, at the interface between the rotating member 14 and the stator 100, are half the size of the cross-section (width) of the passages 16 of the rotating member 14. As can be seen in the first modelled geometry, there is a fluid movement (vortices) 70 that develops inside the cells 46 of the stator 100 and the passages 16 of the rotating member 14 which propagates to the inner interface 19 of the liquid liner 18 and such inner interface is disturbed (not smooth). Adding cells 46 in the stator 100 helps to form a liquid liner with smoother inner interface, as illustrated by the views on the right for the second and third simulated geometry. With respect to the second and third modelled geometry, it can be seen that some fluid motion (vortices) can still develop in the cells 46 and the passages 16, but such vortices do not propagate to the inner interface 19 of the liquid liner 18. Therefore, having a stator 100 with cells' cross-section at the inside wall 45 that is smaller than the cross-section of the outboard end 25 of the passages 16 may prevent the fluid motion between the rotating member 14 and the stator 100.

The size (width/length/depth) and a number of the passages 16 and the cells 46 is configured such that any fluid motion that may occur inside the passages 16 and the cells 46, as a result of interaction between the stationary wall of the vessel 12 or stator 100 and the rotating member 14/114, do not affect the inner interface 19 of the liquid liner 18. For example, the width of the passages 16, 46 needs to be smaller than the length to provide an aspect ratio of the length to width of the fluid passages that will prevent fluid motion propagating to the inner interface 19. In addition, the shape of the cross-section of the outboard opening 25 of the passages 16 of the rotating member can be different than the shape of the cross-section of the cells 46 at the inside wall 45 of the stator in order to prevent development of periodic instabilities between the rotating member 14/114 and the stationary vessel 12/100. For example, the shape of the cross-section of the cells 46 can be rectangular while the shape of the cross-section of the passages 16 can be diamond-shaped (see FIG. 5) or vice-versa, without departing from the scope of the invention. The passages 16 and/or the cells 46 can have any other cross-section shape as long as, during rotation of the rotating member 14/114, the stator's cells 46 do not completely align with the passages 16 of the rotating member 14/114 in order to prevent periodic excitation of fluid motion in the stator and/or the rotating member. In addition, the number of cells 46 with an inside opening at a particular latitude and a number of passages 16 with an outboard opening at such particular latitude is pre-selected so that the greatest common divisor is low in order to prevent periodicity. In some embodiments, the low common divisor can be between 1 and 10 in order to prevent periodic excitation of fluid motion in the stator and/or the rotating member. In one embodiment, the greatest common divisor of the number of cells 46 to number of passages 16 at particular latitude is 1. Latitude is defined as a plane normal to the axis of rotation.

In one implementation, the inner walls of the cells 46 and/or the inner walls of the channels 16 can be ruffled with small longitudinal ridges (scales) aligned along the longitudinal axis of the cells/channels 46/16 to decrease any instabilities or vortices developed therein by reducing drag and/or restrict vortices to stay attached to particular areas of the cells/channels 46/16.

Figure 9:
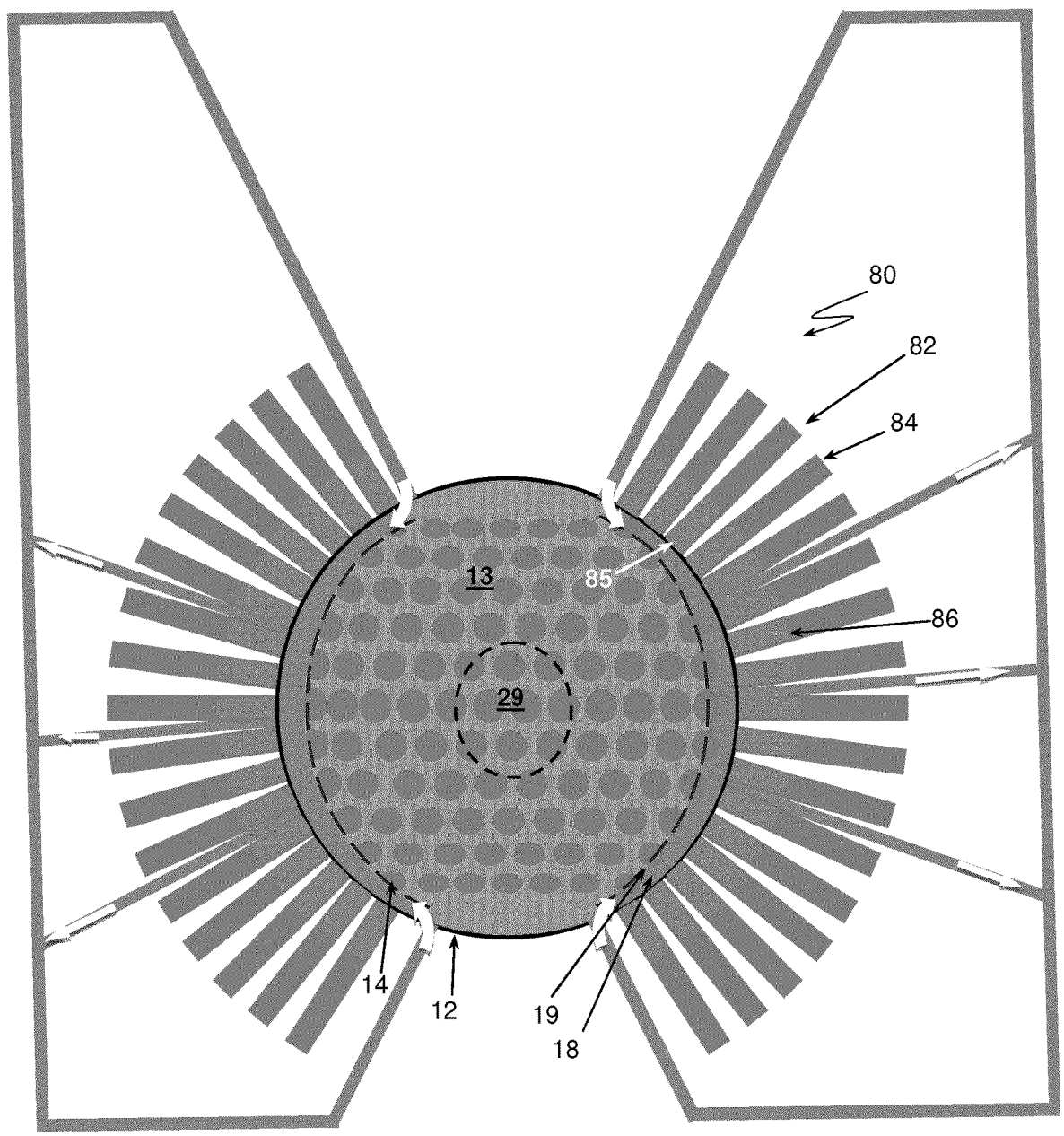
FIG. 9 is a schematic cross-sectional side view of an example of a liquid liner implosion system using a system for forming a liquid liner showing a plurality of piston assemblies as an implosion driver to implode the liquid liner.

The system for forming the cavity 13 and the liquid liner 18 can be used in a liquid liner implosion system for imploding the liquid liner in radial and axial directions. The liquid liner implosion system comprises the system for forming the liquid liner of a cavity and an implosion driver. The implosion driver is in fluid communication with the rotating member 14/114 such that it provides a fluid flow through the outboard openings 25 of the passages 16/116 and displaces the liquid medium in the fluid passages 16/116 through the inboard openings 15, thus causing the liquid liner to implode towards the central region of the cavity. In one implementation, the implosion driver can implode the liquid liner 18 by injecting liquid medium through the outboard openings 25. FIG. 9 illustrates a liquid liner implosion system 80 that comprises a plurality of piston assemblies 82 that are mounted to the outer wall 11 of the vessel 12 and arranged symmetrically around the periphery of the vessel 12. The rotating member 14/114 or an assembly of a rotating member 14/114 and a stator 100 enclosing the rotating member can be inserted into the vessel 12. In one implementation, the stator 100 is connected to the vessel 12 and the rotating member is placed inside facing and spaced apparat from the stator's inside wall. Each of the piston assemblies 82 comprises a housing defining an inner bore with a closed end 84 and an open end 85 that provides a fluid communication with the outboard openings 25 of the passages 16 and the interior of the rotating member. For example, the open end 85 of the piston assemblies 82 can be inserted into a port (e.g. see port 94 of FIG. 10) formed in the wall of the vessel 12, such that the opening 85 of the inner bore is aligned with the circular outer face 148 of the cell clusters 146 (see FIGS. 5 and 6). A piston 86 can be inserted into the inner bore of the piston assemblies 82. The piston 86 is slidably positioned in the inner bore between the closed end 84 and the open end 85 such that the piston 86 can slide towards the open end 85 when a pressure is applied to its back side. A driver can be provided to accelerate the piston 86 towards its open end 85. The driver can be pneumatic, hydraulic, electromagnetic, mechanical or any other suitable driver or a combination thereof. For example, the driver can comprise a pressurized fluid (e.g. compressed gas) injection system that can be used to provide the pressure (pushing force) into the bore (between the piston 86 and the close end 84) to accelerate the piston 86 towards the open end 85. The operation and the timing of the piston assemblies 82 can be synchronized using a controller. The liquid medium flowing in the rotating member 14 is pushed in the inner bore of the piston assemblies 82 through the open end 85, thus partially filling the bore, between a front face of the piston 86 and the open end 85. The liquid entering the inner bore forms a stationary liquid layer. The liquid layer filling the cells 46/146 of the stator 100 and the portion of the liquid in the inner bores of the piston assemblies 82 is therefore stationary. When the injection system injects the pressurized fluid (e.g. compressed gas) into an upper part of the inner bore it accelerates the piston 86 forward towards the open end 85 displacing the stationary liquid layer out of the inner bore and out of the cells 46/146 of the stator 100, so that it can then push on the rotating liquid liner 18 formed in the rotating member 14/114, imploding such liquid liner 18, inwardly collapsing the cavity. The direction of implosion is determined by the orientation of the fluid passages 16/116 of the rotating member 14/114. For example, the fluid displaced out of the passages 16/116 close to the first and the second end 23, 24 of the rotating member will go in a direction vector of the axial and radial directions, aiming toward the central region 29 of the cavity 13, while the fluid displaced out of the fluid passages 16/116 at the equator will go in radial direction toward the central region 29. Thus, the liquid liner 18 will implode in the radial and axial directions toward the central region 29 of the cavity 13. In order to prevent the piston 86 from traveling out of the inner bore, a stopper, such as for example a retaining ring (not shown), can be provided in proximity to the open end 85. The retaining ring can be provided as a security stopper in case one or more of the piston assemblies 82 are fired well ahead of the rest of the piston assemblies 82. The retaining ring can be placed within a seat formed in the housing of the piston assembly 82. Alternatively and additionally, a damping means can be provided to prevent high speed impact of the piston 86 on such retaining ring. After the liquid liner 18 is imploded, the pistons 86 can be returned back to the start position using a return system (not shown). The system for returning the pistons 86 to their start position can be a mechanical, a pneumatic or a hydraulic system or a combination thereof. In one implementation, the pressure of the liquid medium bouncing back at the end of the implosion and/or pressure generated due to the heated and vaporized liquid medium may return the pistons 86 back to the start position.

Figure 10:
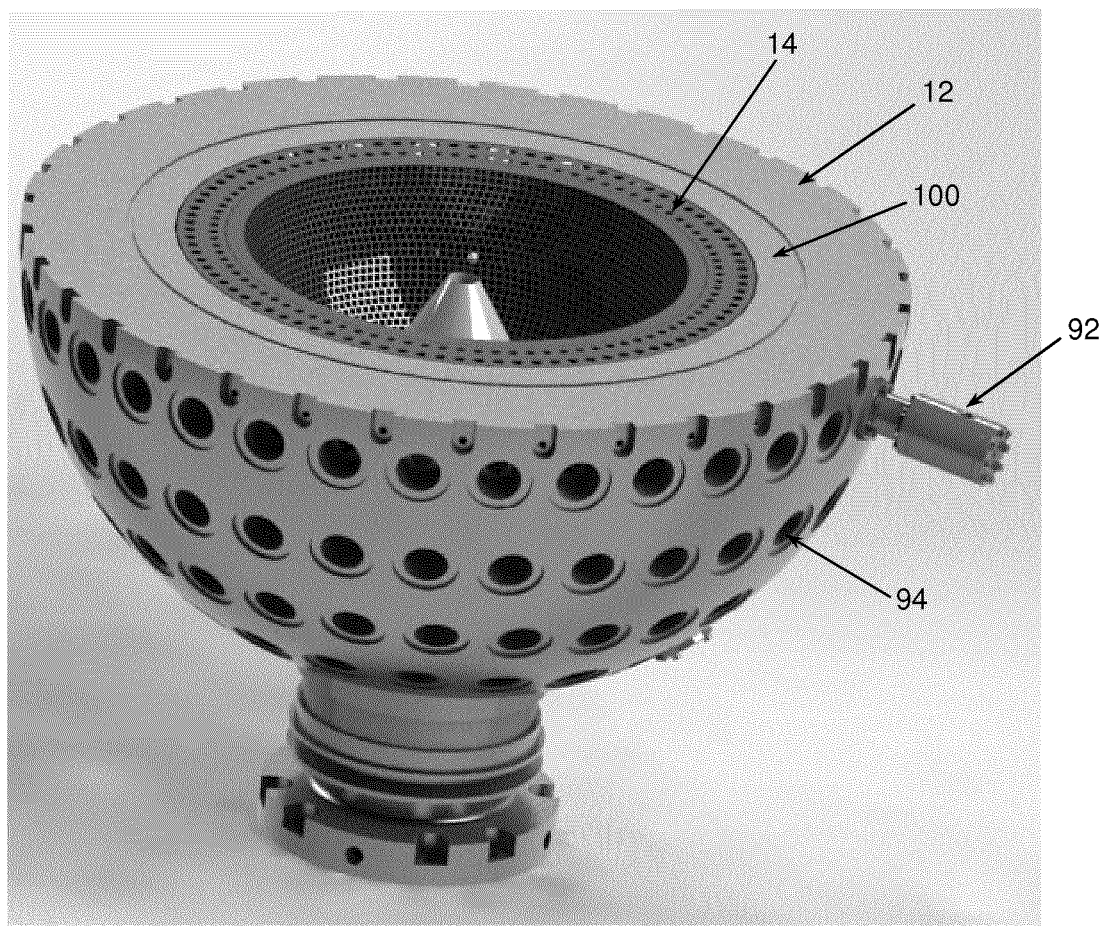
FIG. 10 is a perspective cross-sectional view of an example of a liquid liner implosion system using a system for forming a liquid liner showing a plurality of valves for injecting a pressurized fluid as an implosion driver to implode the liquid liner.

In one implementation, a pressurized fluid (e.g. a compressed gas) can be used to push directly on the liquid medium in the cells 46 of the stator 100. In such case, the plurality of piston assemblies 82 can be replaced with nozzles and the pressurized fluid can be provided through a plurality of valves arranged symmetrically around the periphery of the vessel 12. The pressurized fluid can push the stationary liquid layer that can be formed in the valve's housing and/or the stationary liquid layer filling the cells 46/146 of the stator 100 displacing it and pushing on the rotating liquid liner 18, imploding it inward toward the central area of the cavity. FIG. 10 is a partial cross-sectional view of a liquid liner implosion system that comprises a plurality of valves 92 arranged around the circumference of the vessel 12. The vessel 12 comprises a plurality of ports 94 arranged around the circumference of the vessel 12 in which the valves 92 can be installed. The pressurized fluid (e.g. a compressed gas) is injected through each of the valves 92 pushing on the liquid medium in the stator (as described herein above) and imploding the liquid liner 18 inwardly. The parameters and shape of the liquid liner 18 during implosion can be controlled by controlling the timing of the valves 92 and the pressure through each of the valves 92. Persons skilled in the art understand that the valves 92 described with respect to FIG. 10 can be replaced by the piston assemblies 82 of FIG. 9 without departing from the scope of the invention.

In one implementation, the implosion driver can comprise a plurality of valves 92 and a plurality of piston assemblies 82. For example, the plurality of valves 92 can provide a smaller pushing force to move the interface 19 of the liquid liner 18 inwards from the inner surface 26 of the rotating member. Thus, the curvature of the inner interface 19 can smoothen before the piston assemblies 82 are triggered. When the plurality of piston assemblies 82 are triggered, the liquid liner 18 implodes inwardly, collapsing the cavity 13. The plurality of piston assemblies 82 provides the additional pushing force to fully implode the liquid liner 18 toward the central region, collapsing the cavity 13. The valves 92 can be brought in fluid communication with the rotating member 14 through ports that are separate from the ports for the piston assemblies 82. A controller (not shown) can be provided to control the triggering time of the piston assemblies 82 and the valves 92. For example, the controller can be in communication with the implosion driver (pistons 82 and valves 92) such that it can send a first trigger signal to provide a first stage implosion to move the liquid liner interface inwards from the inner surface 26 of the rotating member (to smoothen the interface) and then can provide a second trigger signal to provide a second stage implosion for full liquid liner implosion and collapsing the cavity. In one implementations, the piston assemblies 82 can be adjusted to provide the pushing force in two stages; in the first stage, the pistons 86 can move slightly down the inner bore to move the liquid liner inner interface 19 inwards from the inner surface 26 and then in the second stage the pistons 86 can be accelerated all the way to the open end 85 to fully implode the liquid liner 18 and collapse the cavity 13.

Figure 11:
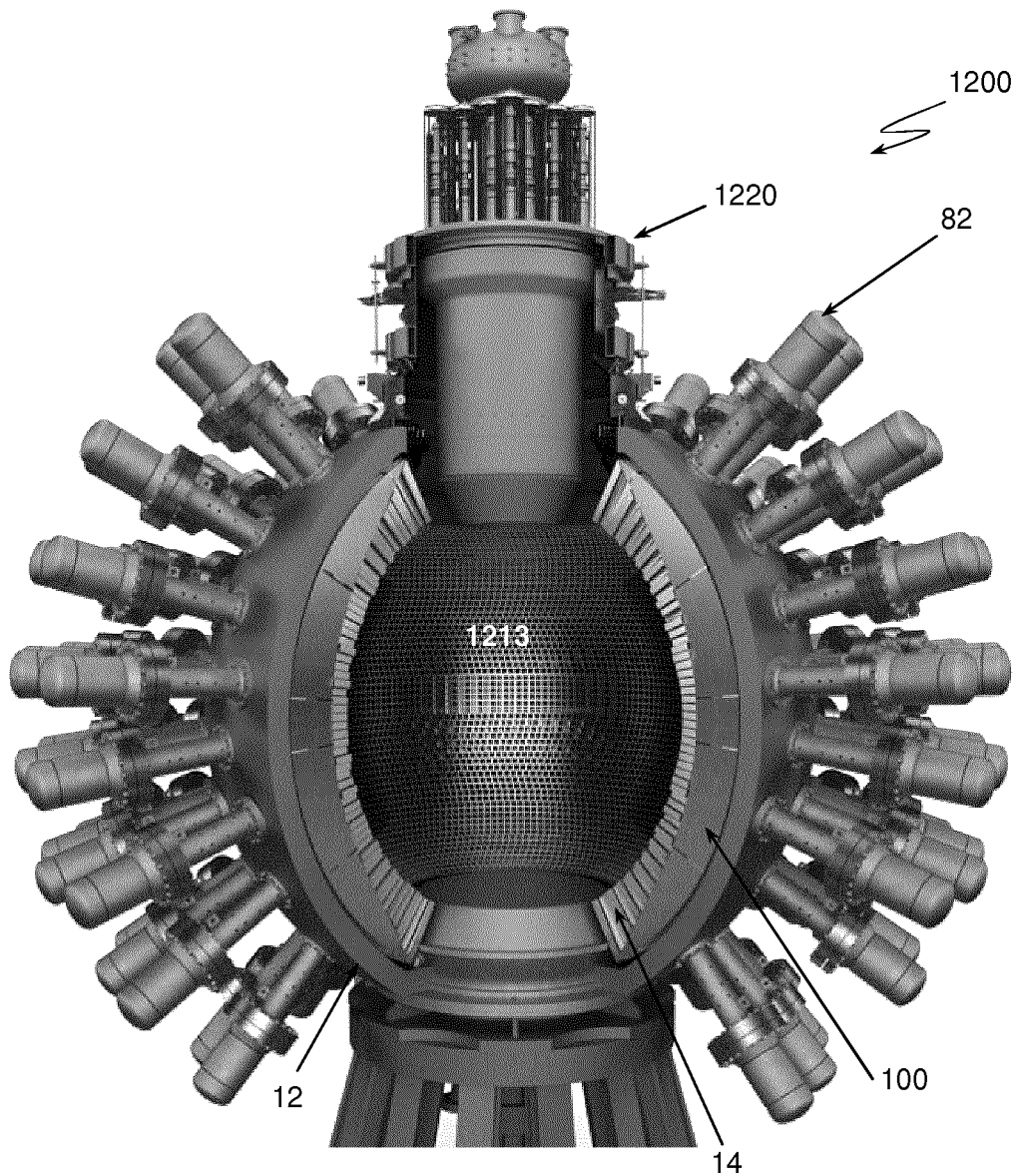
FIG. 11 is a side cross-sectional view of an example of a plasma compression system using a liquid liner implosion system to compress plasma.

The liquid liner implosion systems, described herein above, can be used in plasma compression systems for compressing plasma. The plasma compression system comprises a plasma generator to generate plasma and inject such plasma into an evacuated cavity formed within a liquid liner, and a liquid liner implosion system to implode the liquid liner inwardly towards a central region of the evacuated cavity to compress the plasma trapped therein. FIG. 11 illustrates an example of a plasma compression system 1200 that comprises a plasma generator 1220 which is configured to generate plasma and inject such plasma into the evacuated cavity 1213 formed in the rotating member 14. The plasma can be magnetized plasma, such as for example a compact toroid (CT). The plasma generator 1220 is connected to the vessel 12 such that an outlet of the plasma generator 1220 is aligned with an annular opening formed in the wall 11 of the vessel 12 and with the entrance opening 28 of the rotating member 14, so that the plasma generated in the plasma generator 1220 is injected into the evacuated cavity 1213 inside the rotating member 14. When the implosion driver is triggered, e.g. when the pistons 86 of the piston assemblies 82 are accelerated displacing the liquid layer out of the inner bore and out of the cells 46 or the stator 100, the rotating liquid liner 18 formed in the rotating member 14 is imploded inwardly collapsing the cavity 1213 and compressing the plasma trapped therein.

Figure 12:
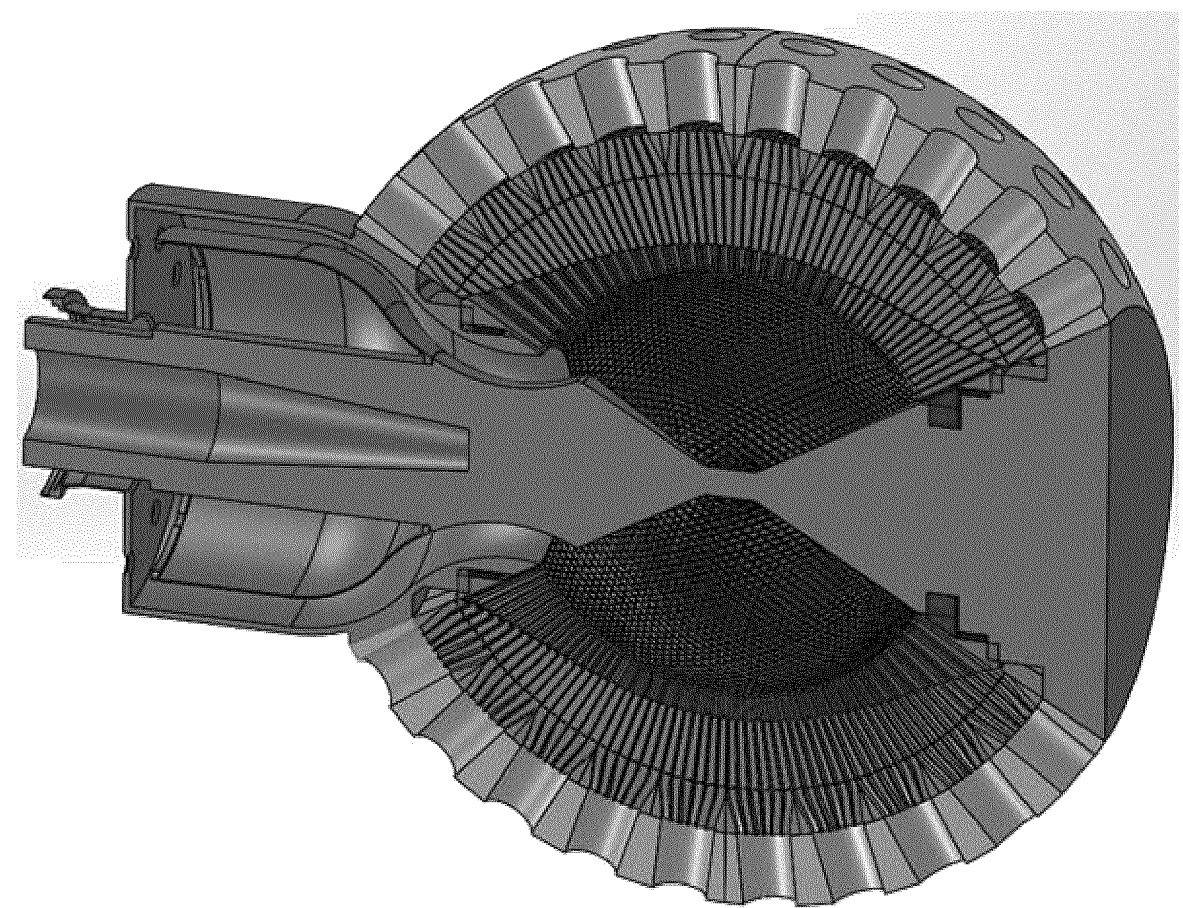
FIG. 12 is a side cross-sectional view of a horizontally oriented plasma compression system using a liquid liner implosion system to compress plasma.

The systems for imploding a liquid liner illustrated in any of the FIGS. 1-11 are vertically oriented, however persons skilled in the art would understand that such systems can be in horizontal orientation or tilted at an angle without departing from the scope of invention. For example, FIG. 12 shows a plasma compression system which is horizontally oriented. One reason to have the system horizontal or tilted is because bearings of the rotating member in the horizontally oriented systems can have a less expensive design.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

What is claimed is:

1. A system for forming a liquid liner of a cavity, the system comprising:
   a vessel having an outer wall;
   a rotating member positioned inside the vessel and rotatable about an axis of rotation, the rotating member comprising:
   i. a first end and a second end along the axis of rotation;
   ii. an inner surface defining an interior volume and curved with respect to the axis of rotation;
   iii. an outer surface having a shape that is a function of a shape of the inner surface; and
   iv. a plurality of fluid passages each having an inboard opening at the inner surface and an outboard opening at the outer surface;
   a rotating driver operationally coupled to the rotating member to rotate the rotating member; and
   a liquid medium in the vessel, the liquid medium at least partially filling the fluid passages and forming a liquid liner when the rotating member is rotating, an inner interface of the liquid liner defining a cavity coaxial with the axis of rotation, the inner interface being curved with respect to the axis of rotation.

2. The system of claim 1, wherein the shape of the outer surface of the rotating member is determined according to an equation $$P_{out(top)} + \rho g(z_o - z) = P_{in} + \rho \omega^2 \int_{r_i(z)}^{r_o(z)} r\, dr$$

where $P_{out(top)}$ is a pressure at the outer surface at the first end of the rotating member; $P_{in}$ is a pressure at the inner surface of the rotating member; $z_o$ is a reference point at the inner surface; z is a variable distance along the axis of rotation; $\rho$ is a density of the liquid medium; g is an acceleration due to gravity along the axis of rotation; $\omega$ is rotational speed in rad/s; r is a variable perpendicular distance from the axis of rotation; $r_o(z)$ is a function defining the radius of the outboard openings of the passages from the axis of rotation and $r_i(z)$ is a function defining the radius of the inboard openings of the passages from the axis of rotation.

3. The system of claim 1, wherein the inner surface of the rotating member curves inwardly towards each of the first end and the second end.

4. The system of claim 3, wherein when the first end of the rotating member is above the second end, the rotating member is asymmetric about an equatorial plane such that a difference between a radius of the outboard opening from the axis of rotation and a radius of the inboard opening from the axis of rotation ($\Delta r$) at the first end is smaller than the $\Delta r$ at the second end.

5. The system of claim 1, wherein an aspect ratio of a depth to a width of each of the passages is at least 3:1.

6. The system of claim 1, wherein the inboard opening of the passages is directed and converges towards the central region.

7. The system of claim 1, wherein each of the plurality of passages comprise a wall extending between the outboard opening and the inboard opening, at least one of the plurality of passages having a cross section that tapers inwardly from the outboard opening towards the inboard opening of the passage, the liquid medium able to flow between the inboard and the outboard openings along a longitudinal axis of the passages.

8. The system of claim 7, wherein the wall of the at least one of the plurality of passages is tapered at the inboard opening.

9. The system of claim 1 wherein the rotating member further comprises a plurality of axially spaced rings, and a plurality of radially spaced posts extending between the plurality of rings, wherein the plurality of posts and the plurality of rings define the plurality of fluid passages.

10. The system of claim 1, wherein the vessel further comprises a stator enclosing the rotating member, the stator comprising a first end axially aligned with the first end of the rotating member, a second end axially aligned with the second end of the rotating member, an inside wall facing and spaced apart from the outer surface of the rotating member and cells between the inside wall and the outer wall, wherein the cells are open at the inside wall and at the outer wall.

11. The system of claim 10, wherein the stator further comprises axially spaced ledges and radially spaced dividers, the ledges and dividers extending between the outer wall and the inside wall and arranged to define the cells at an aspect ratio of a cell depth to a cell width of at least 3:1.

12. The system of claim 11, wherein at least some of the ledges in at least some of the cells comprise at least one hole which allows the flow of the liquid medium, the at least some ledges comprising at least one hole arranged so that when the rotating member is rotating the liquid medium flows toward the first end and the second end.

13. The system of claim 10, wherein a shape of a cross-section of the cells' opening at the inside wall of the stator is different from a shape of a cross-section of the outboard opening of the rotating member, the shape of the cross-section of the outboard opening being selected such that during rotation of the rotating member the plurality of passages in the rotating member do not completely align with the inside opening of the cells of the stator.

14. The system of claim 10, wherein a cross-sectional area of the cells at the inside wall of the stator is smaller than a cross-sectional area of the passages at the outer surface of the rotating member.

15. The system of claim 10, wherein a greatest common divisor of a number of cells with an inside opening at a plane normal to the axis of rotation to a number of passages having the outboard opening at the same plane is between 1 and 10.

16. The system of claim 15, wherein the greatest common divisor of the number of cells to the number of passages is 1.

17. The system of claim 10, wherein inner walls of at least one of the cells and the passages are ruffled with longitudinally extending ridges.

18. A liquid liner implosion system for collapsing a cavity by imploding a liquid liner of the cavity, the liquid liner implosion system comprising:
a system for forming a liquid liner as claimed in claim 1; and
an implosion driver in fluid communication with the rotating member and operable to provide a fluid flow through the outboard openings of the rotating member, thereby displacing the liquid medium in the passages through the inboard openings of the rotating member, and causing the liquid liner to implode towards a central region of the cavity.

19. The liquid liner implosion system of claim 18, wherein the fluid is the liquid medium, and the implosion driver comprises a plurality of piston assemblies connected to the outer wall of the vessel and arranged symmetrically around the periphery of the outer wall, each of the piston assemblies comprising:
a housing defining an inner bore with an open end fluidly communicable with at least some of the outboard openings of the rotating member such that the liquid medium partially fills the inner bore, and a closed end;
a piston slidably positioned in the inner bore between the open end and the closed end;
a driver operable to drive the piston towards the open end, such that the liquid medium in the inner bore is injected through the outboard openings of the rotating member, thereby displacing the liquid medium in the passages through the inboard openings of the rotating member.

20. The liquid liner implosion system of claim 18, wherein the fluid is a pressurized fluid, and the liquid liner implosion system comprises:
a plurality of valves connected to the outer wall of the vessel and arranged symmetrically around a periphery of the vessel and fluidly communicable with at least some of the outboard openings of the rotating member; and
a source of the pressurized fluid in fluid communication with the plurality of valves,
the valves operable to inject the pressurized fluid through the outboard openings of the rotating member into the plurality of fluid passages of the rotating member.

21. The liquid liner implosion system of claim 18, further comprising a controller in communication with the implosion driver, the controller programmed to send a first trigger signal to the implosion driver to provide a first stage implosion to move the interface inwards from the inner surface of the rotating member and a second trigger signal to provide a second stage implosion to collapse the cavity.

22. A plasma compression system comprising:
the liquid liner implosion system of claim 18; and
a plasma generator configured to generate plasma and having an outlet, the plasma generator connected to the vessel such that the outlet of the plasma generator is inserted in an opening formed in the outer wall of the vessel, the vessel's opening being aligned with an entrance opening formed at one of the first or the second ends of the rotating member, the generated plasma being injectable into the cavity, whereby the imploding liquid liner collapses the cavity and compresses the plasma trapped therein.

* * * * *